March 17, 1953     R. E. ANTHEIL     2,631,961
METHOD OF BONDING BRAKE LININGS TO BRAKE SHOES
Filed Jan. 24, 1947
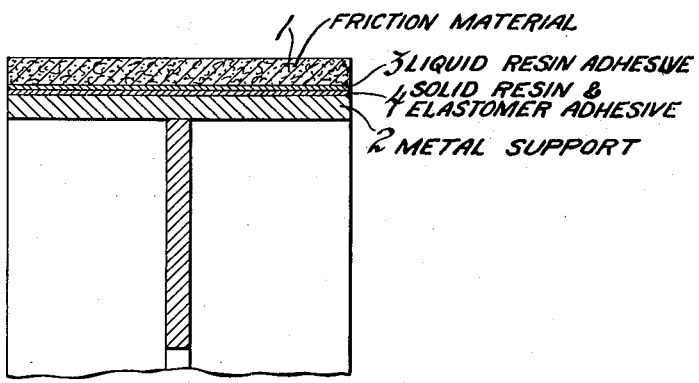
Inventor
Robert Earle Antheil Patented Mar. 17, 1953

2,631,961

UNITED STATES PATENT OFFICE 2,631,961

METHOD OF BONDING BRAKE LININGS TO BRAKE SHOES

Robert E. Antheil, Dayton, Ohio, assignor to General Motors Corporation, Detroit, Mich., a corporation of Delaware Application January 24, 1947, Serial No. 724,050

4 Claims. (Cl. 154—130)

My invention relates to an improved bonding material and method of bonding.

The invention is particularly applicable to bonding a friction surface to the metal support, such as the shoe or drum of brakes or the cone or plate of a clutch.

The brake construction in general use involves a rigid molded brake lining or friction surface riveted to a metallic brake shoe. The rivets and their countersunk openings substantially reduce the life of the brake lining, since the openings collect abrasive particles which score the brake drum and the lining cannot be used below the surface of the rivets.

Though attempts have been made to provide a brake construction in which the lining is cemented or bonded to the drum, this type of construction has not been accepted by the automotive industry since the failure under destructive testing generally occurred in the bond. However, when the lining is bonded to the brake shoe in accordance with my invention the failure under destructive test will always occur in the lining material.

The object of this invention is to provide an improved bonding material and method of bonding.

Another object of this invention is to provide an improved bond between a friction surface and the metal supporting element.

Another object of this invention is to provide an improved bond between a moulded brake lining and brake shoe.

Another object is to provide a method of bonding which will produce standard results with unskilled labor.

Further objects will appear in the description of the preferred embodiment shown in the accompanying drawing, in which the drawing is a cross section of a brake shoe with the lining bonded thereto in accordance with the invention.

As shown in the drawing the moulded brake lining or friction material is bonded to the conventional steel brake shoe or support by a liquid bonding or adhesive material applied to the lining and a ribbon or strip of solid plastic bonding or adhesive material.

The brake lining may be the conventional type formed of asbestos fiber and resin which are normally of a hard, dense and somewhat brittle character. The inner face of the lining is coated with a liquid thermosetting resin of the phenol formaldehyde type, dissolved in a ketone or alcohol, such as methyl ethyl ketone, acetone, or ethyl alcohol, etc. Either a single stage phenol formaldehyde resin or a two-stage phenol formaldehyde resin with a curative, such as hexamethylenetetramine, may be used.

The solution should be thin enough so that the resin penetrates the surface of the brake lining to a small depth. It has been found that a phenol formaldehyde resin and solvent solution of 20 to 50% solids will penetrate sufficiently to form a good bond and does not interfere with the character of the brake lining.

The plastic bonding material is essentially a compound comprising an elastomer such as a synthetic rubberlike base material and a powdered thermo-setting resin. Synthetic rubberlike materials, commercially known as "Hycar" and "Chemigum," which are a butadiene acrylic nitrile type copolymer or "neoprene," a polymer of chloroprene, which is a chlorinated butadiene, may be used. The rubberlike stock is preferably compounded on cold tight mill rolls with curatives such as an activator, accelerator, vulcanizing agent and anti-oxidant, to improve the quality of the rubber. However, it is not essential for all purposes to employ all of the curatives.

The vulcanizing agent, such as sulphur, is aided by an accelerator such as mercapto-benzo-thiazole, sold under the trade name "Captax." Other types of accelerators, such as thiurams, guanidines and their derivatives, may be used. Zinc oxide is employed as an activator. As an anti-oxidizing agent phenyl-beta-napthylamine, sold under the trade name "Neozone D," or any of the age-resisting anti-oxidants used in the rubber industry, may be used. When these ingredients are blended with the rubberlike material the compound is allowed to cool.

When the compounded rubber has cooled the powdered thermosetting resin is blended with the rubber compound as quickly as possible on cold rolls. The temperature should be kept below the fusing point of the resin. During the compounding the resin acts as a filler which tends to deaden the nerve of the rubber in the same manner as carbon black. The resin may be any thermo-setting resin of the phenolic type, such as phenol-formaldehyde or cresol-formaldehyde or mixtures thereof. Preferably the resin is either a single-stage phenol-formaldehyde or a two-stage phenol-formaldehyde with a curative agent such as hexamethylenetetramine.

In commercial production, where it is often difficult to control the temperature of the mixture during compounding, the synthetic rubber may be mixed with the curatives and a two-stage phenol-formaldehyde resin. Since the two-stage resin will not cure in the absence of a curing agent, the temperature of the mix does not need to be closely controlled during this preliminary mixing stage. When these ingredients are thoroughly mixed and the mixture cooled, the resin curing agent, hexamethylenetetramine, is mixed with the rubber resin compound to form the finished adhesive.

The rubber to resin ratio of the adhesive bonding material may be varied through a wide range from a 4:1 to 1:9 rubber to resin ratio, depending on the type of bonding material desired. The bonding materials with a high rubber content are more flexible but weaker as adhesives, while the bonding materials with a high resin content are more brittle but have a higher bond strength.

The loss in bond strength at elevated temperatures is less for the adhesives high in resin content. For high strength adhesives under normal temperature conditions a rubber to resin ratio of from 3:1 to 2:3 is required. In some bonding applications where high fluidity under heat during bonding is desired, a plasticizer such as dibutyl phthalate is advantageous in the adhesive.

For a bond requiring the highest strength and minimum loss of strength at elevated temperatures, as is required in bonding friction material to a metal support, the following is the preferred adhesive composition:

| | Parts |
|---|---|
| "Hycar" | 100 |
| Zinc oxide | 5 |
| "Captax" | 1 |
| Sulphur | 1 |
| "Neozone D" | 5 |
| Phenol-formaldehyde resin | 150 |

After the rubber compound and the resin are compounded to form the adhesive, it is calendered on rolls into a ribbon. The temperature of the rolls is kept high enough so that the mixture may be formed into a ribbon but must not exceed the fusing temperature of the resin. The temperature of the adhesive mixture should be maintained about 140° to 160° F. by suitably warming the rolls.

In the process of bonding the lining to the shoe, both surfaces must be perfectly clean to produce a good bond. The brake shoes are pickled and then zinc-plated in the conventional manner. The zinc is then removed on the bonding surface by abrasion with a grit or sand-blast machine. After the grit is removed with clear hot water and dried, the shoe is ready for bonding.

The clean concave surface of the lining is then coated preferably by spraying, but brushing and glue-spreader application are also satisfactory, with the resin and solvent solution, and air-dried by heating to about 150° F. for 15 minutes. Higher temperatures will decrease the drying time, but the temperature should be maintained well below the fusion temperature of the resin. A strip of the bonding ribbon is then placed over the entire surface of the clean shoe and the lining positioned on the ribbon. The assembly is then positioned in a clamp to apply a uniform pressure to insure intimate contact between the bonding surfaces, and then heated in an oven or induction heater to completely cure the resin and vulcanize the rubber in both bonding layers simultaneously. A pressure of 20 to 40 pounds per square inch is generally sufficient to insure intimate contact between the surfaces and will cure at temperatures between 300° and 400° F. With porous lining materials higher pressures increase the penetration of the adhesive in the lining, and thus improve the bond. Excellent bonds have been made at pressures between 250 and 350 pounds per square inch heated in an even at 390° to 400° F. for 30 minutes.

The friction material assemblies bonded by this process, which employs both a rubber resin adhesive tape and a liquid resin, have consistently exhibited higher bond strengths than the shear strength of the conventional moulded brake lining material. Thus this bonding process will secure the lining material with a strength equal to or greater than the best riveted construction. The unusually high bond strength as compared with either the liquid-resin or rubber-resin adhesives used alone may, it is believed, be attributed to the particular combination of adhesives. The liquid-resin runs or wicks into the pores of the lining material and may flux with the lining resin during bonding to provide more intimate contact and to rigidify the lining surface. The rubber-resin tape provides a resilient bond with the metal shoe. Thus there is in contact with each material of the friction assembly an adhesive forming a higher strength bond with that material.

I claim:

1. A process of making a friction assembly by bonding a resin impregnated fibrous friction material lining to a metallic support member which comprises coating the resin impregnated fibrous material with a liquid thermosetting phenol formaldehyde resin, applying to the metallic support member a solid adhesive consisting of a physical mixture of an elastomer selected from the group consisting of butadiene acrylic nitrile copolymers and chloroprene polymers and a powdered thermosetting resin selected from the group consisting of phenol formaldehyde, cresol formaldehyde, and mixtures of phenol formaldehyde and cresol formaldehyde at a temperature below the fusion point of the resin, assembling the friction material and the metallic support member with the coating and adhesive in contact, applying heat and pressure to bond the assembly.

2. A process of bonding a high temperature resin impregnated fibrous friction material lining to a metallic support member to provide a friction assembly which comprises coating the resin impregnated fibrous friction material with a liquid thermosetting resin selected from the group consisting of phenol formaldehyde, cresol formaldehyde and mixtures of phenol formaldehyde and cresol formaldehyde, applying to the metallic support a solid adhesive consisting of a physical mixture in dry condition of an elastomer selected from the group consisting of butadiene acrylic nitrile copolymers and chloroprene polymers and a powdered thermosetting resin selected from the group consisting of phenol formaldehyde, cresol formaldehyde and mixtures thereof at a temperature below the fusion point of the resin, assembling the friction material and the metallic support member with the coating and adhesive in contact, applying heat and pressure to bond the assembly.

3. A process of bonding a high temperature resin impregnated fibrous friction material lining to a metallic support to provide a friction assembly which comprises coating the resin impregnated fibrous friction material with a liquid thermosetting resin having 20 to 60 percent solids selected from the group consisting of phenol formaldehyde, cresol formaldehyde and mixtures of phenol formaldehyde and cresol formaldehyde, applying to the metallic support a solid adhesive consisting of a physical mixture in dry condition of an elastomer selected from the group consisting of butadiene acrylic nitrile copolymers and chloroprene polymers and a powdered thermosetting resin selected from the group consisting of phenol formaldehyde, cresol formaldehyde and mixtures thereof at a temperature below the fusion point of the resin, assembling the friction material and the metallic support with the coating and adhesive in contact, applying heat and pressure to bond the assembly.

4. A process of bonding a high temperature resin impregnated fibrous friction material lining to a metallic support member to provide a friction assembly which comprises coating the resin impregnated fibrous friction material with a liquid thermosetting resin selected from the group consisting of phenol formaldehyde, cresol formaldehyde and mixtures of phenol formaldehyde and cresol formaldehyde, applying to the metallic support a solid adhesive consisting of a physical mixture in dry condition of a 2 parts elastomer selected from the group consisting of butadiene acrylic nitrile copolymers and chloroprene polymers and a 3 parts powdered thermosetting resin selected from the group consisting of phenol formaldehyde, cresol formaldehyde and mixtures thereof at a temperature below the fusion point of the resin, assembling the friction material and the metallic support member with the coating and adhesive in contact, applying heat and pressure to bond the assembly.

ROBERT E. ANTHEIL.

REFERENCES CITED

The following references are of record in the file of this patent:

UNITED STATES PATENTS

| Number | Name | Date |
|---|---|---|
| 1,888,179 | Nash | Nov. 15, 1932 |
| 2,376,854 | Saunders et al. | May 22, 1945 |
| 2,386,112 | Harkins | Oct. 2, 1945 |
| 2,394,478 | Prentice | Feb. 5, 1946 |
| 2,398,890 | Howard | Apr. 23, 1946 |
| 2,415,097 | Hasimoto | Feb. 4, 1947 |
| 2,426,421 | Tilden et al. | Aug. 26, 1947 |
| 2,479,342 | Gibbons | Aug. 16, 1949 |

OTHER REFERENCES

"Cyclewelding," American Machinist, January 4, 1944, pp. 106–114.

"Business Week," December 21, 1946, page 60.

Modern Plastics, September 1943, pages 65–69 and 152.